(12) United States Patent
Bialer et al.

(10) Patent No.: US 10,591,584 B2
(45) Date of Patent: Mar. 17, 2020

(54) RADAR CALIBRATION WITH KNOWN GLOBAL POSITIONING OF STATIC OBJECTS

(71) Applicant: GM Global Technology Operations LLC, Detroit, MI (US)

(72) Inventors: Oded Bialer, Petah Tivak (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 551 days.

(21) Appl. No.: 15/333,572

(22) Filed: Oct. 25, 2016

(65) Prior Publication Data
US 2018/0113195 A1    Apr. 26, 2018

(51) Int. Cl.
*G01S 7/40* (2006.01)
*G01S 13/86* (2006.01)
*G01S 13/93* (2006.01)
*G01S 13/931* (2020.01)

(52) U.S. Cl.
CPC ............ *G01S 7/4004* (2013.01); *G01S 13/86* (2013.01); *G01S 7/4026* (2013.01); *G01S 13/865* (2013.01); *G01S 13/867* (2013.01); *G01S 13/931* (2013.01); *G01S 2013/9353* (2013.01); *G01S 2013/9357* (2013.01)

(58) Field of Classification Search
CPC ................... G01S 13/86; G01S 13/343; G01S 7/40–4026; G01S 19/13; G01S 13/931; G01S 2013/9357; G01S 2013/9353; G01S 2007/4091; G01S 13/867; G01S 2013/9375; G01S 13/865
See application file for complete search history.

(56) References Cited

U.S. PATENT DOCUMENTS

| | | | | |
|---|---|---|---|---|
| 4,489,322 A | * | 12/1984 | Zulch | G01S 13/867 342/149 |
| 6,611,741 B2 | * | 8/2003 | Michi | G01S 7/4026 303/140 |
| 6,927,725 B2 | * | 8/2005 | Wittenberg | G01S 7/4004 342/165 |
| 7,633,431 B1 | * | 12/2009 | Wey | G01S 7/4026 342/75 |
| 7,965,225 B1 | * | 6/2011 | Dickerson | G01S 7/4026 342/73 |
| 8,692,707 B2 | * | 4/2014 | Lee | G01S 7/4026 342/141 |
| 2007/0208507 A1 | * | 9/2007 | Gotoh | G01C 21/30 701/414 |

(Continued)

*Primary Examiner* — Matthew M Barker
(74) *Attorney, Agent, or Firm* — Cantor Colburn LLP

(57) ABSTRACT

A system and method perform calibration of a radar system on a mobile platform. A position of the platform is obtained along with a relative position of one or more stationary objects from the platform using the position of the platform and a mapping algorithm as ground truth and one or more radar parameters regarding the one or more stationary objects using the radar system, the one or more radar parameters including an angle estimate. The method includes determining a correction matrix based on the one or more parameters and the ground truth, and obtaining corrected received signals from subsequent received signals of the radar system based on the correction matrix.

8 Claims, 2 Drawing Sheets

(56) References Cited

U.S. PATENT DOCUMENTS

| | | | |
|---|---|---|---|
| 2009/0228204 A1* | 9/2009 | Zavoli | G01C 21/30 |
| | | | 701/532 |
| 2010/0076710 A1* | 3/2010 | Hukkeri | G01S 7/4004 |
| | | | 702/97 |
| 2017/0038477 A1* | 2/2017 | Schmid | G01S 19/48 |
| 2017/0212215 A1* | 7/2017 | Hellinger | G01S 7/4026 |
| 2018/0149739 A1* | 5/2018 | Becker | G01S 19/40 |

* cited by examiner

RADAR CALIBRATION WITH KNOWN GLOBAL POSITIONING OF STATIC OBJECTS

FIELD OF THE INVENTION

The subject invention relates to radar calibration with known global positioning of static objects.

BACKGROUND

Radar calibration is a necessary process to understand and ensure the accuracy of information (e.g., range, velocity, position) obtained by a radar system about one or more targets. The calibration process requires ground truth on the radar target. That is, the relative position of the radar system and the target must be known in order to compare the known information with the information obtained by the radar system and implement corrections or record biases, as needed. However, when the radar system is on a moving platform (e.g., automobile, other type of vehicle), the calibration process is complicated by the fact that the platform cannot simply be brought back to an area in which ground truth information is available for one or more targets in order to perform the calibration. Accordingly, it is desirable to provide a calibration process that uses static objects in the vicinity of the moving platform, wherever that may be.

SUMMARY OF THE INVENTION

In one exemplary embodiment of the invention, a method of performing calibration of a radar system on a mobile platform includes obtaining a position of the platform; obtaining a relative position of one or more stationary objects from the platform using the position of the platform and a mapping algorithm as ground truth; obtaining one or more radar parameters regarding the one or more stationary objects using the radar system, the one or more radar parameters including an angle estimate; determining a correction matrix based on the one or more parameters and the ground truth; and obtaining corrected received signals from subsequent received signals of the radar system based on the correction matrix.

In another exemplary embodiment, a calibration system for a radar system on a mobile platform includes a satellite or cellular-based receiver configured to obtain a position of the platform; a mapping algorithm configured to obtain a relative position of one or more stationary objects from the platform as ground truth based on the position of the platform; the radar system configured to obtain one or more radar parameters regarding the one or more stationary objects, the one or more radar parameters including an angle estimate; and a processor configured to determine a correction matrix based on the one or more parameters and the ground truth and obtain corrected received signals from subsequent received signals of the radar system based on the correction matrix.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
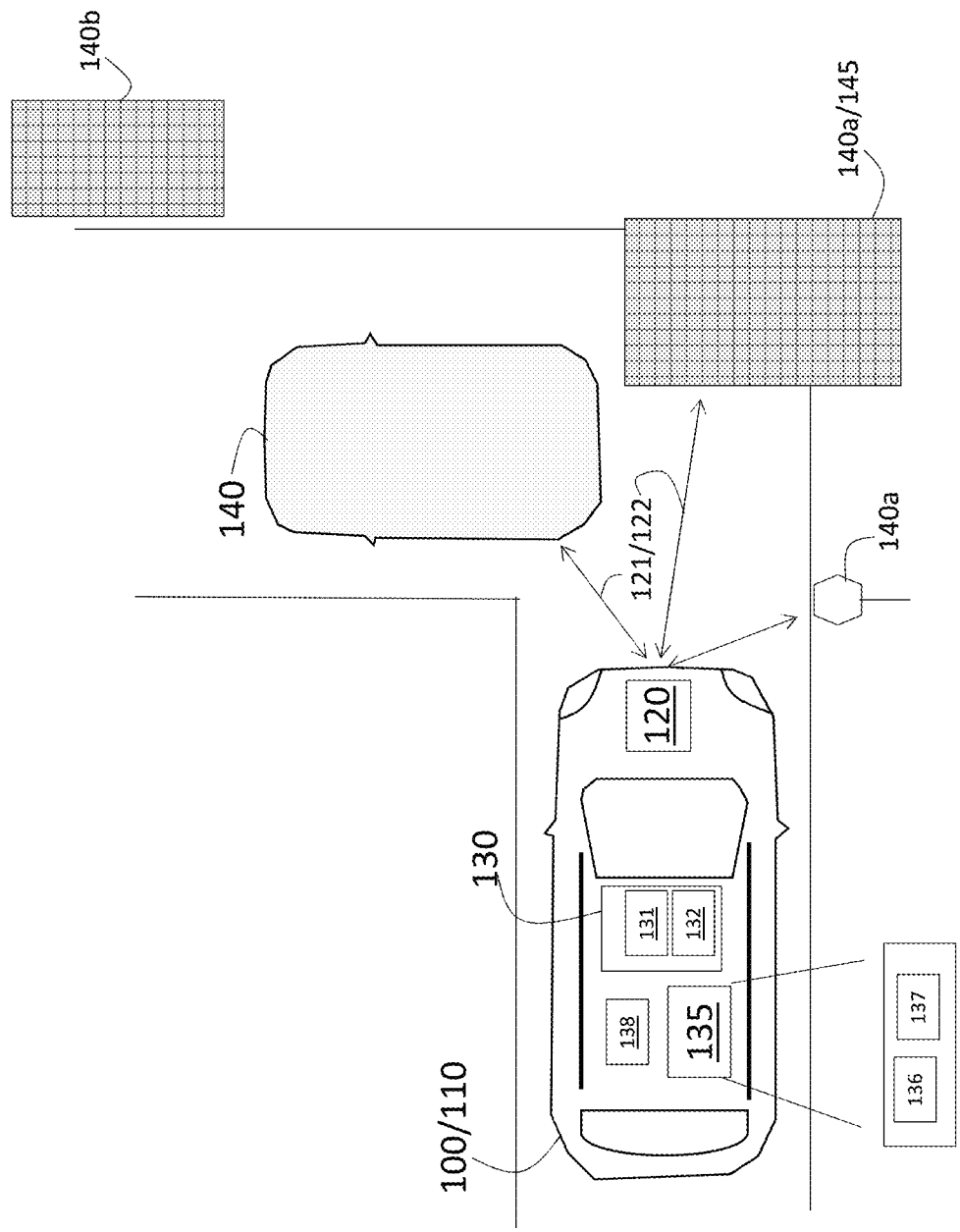
FIG. 1 shows a block diagram of a radar calibration system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, calibration of a radar system requires knowledge of the actual location of targets used in the calibration relative to the radar system. When the radar system is on a moving platform, the static targets used from one calibration to the next or within one calibration may be different. Embodiments of the methods and systems detailed herein relate to performing radar calibration using a determination of the global position of the moving platform and a local mapping of static objects. As described below, once the position of the platform is determined, this position is used in conjunction with mapping information to determine the precise relative position of static objects that may be used to calibrate the radar system.

In accordance with an exemplary embodiment of the invention, FIG. 1 shows a block diagram of a radar calibration system according to one or more embodiments. The exemplary platform 100 for the radar system 120 is an automobile 110. The radar system 120 may be a known multi-input multi-output (MIMO) system that includes an array of transmit elements to output transmitted signals 121 and an array of receive elements to receive reflections 122 resulting from each of the transmitted signals 121. The transmit elements may each transmit in turn in a time division multiple access (TDMA) configuration. In alternate embodiments, the transmit elements may each transmit different binary codes at the same or at overlapping times. The transmitted signals 121 may include the code as a set of chirps or linear frequency modulated continuous wave (LFM-CW) pulses. The radar system 120 is not limited to have any particular arrangement or transmission scheme.

The exemplary platform 100 includes a GPS receiver 132 and may include other sensors 130 such as a camera 131, lidar system, or infrared sensor. The GPS receiver 132 provides a position of the platform 100 using a known satellite-based positioning technique. In alternate embodiments, other satellite-based positioning (e.g., Galileo) systems or other schemes may be used to obtain the position of the platform 100 at any given time. For example, cellular based positioning may be obtained via triangulation using cellular towers accessed by a cellular device 138 in the platform 100. According to yet another alternate embodiment, a fingerprint matching technique may be used. This involves pre-mapping or fingerprinting locations via visual cues (using the camera 131), radio frequency signal strength of the radar system 120, or the like and matching the current location of the platform 100 to a pre-mapped or fingerprinted location.

A controller 135 is shown to include one or more processors 136 and one or more memory devices 137. The controller 135 generally refers to processing circuitry that may include an application specific integrated circuit (ASIC), an electronic circuit, a processor 136 (shared, dedicated, or group) and memory that executes one or more software or firmware programs, a combinational logic circuit, and/or other suitable components that provide the described functionality. The controller 135 can include other known components such as a communication interface to communicate within and outside the platform 100 (e.g., wirelessly communicate with another processor).

According to exemplary embodiments, the controller 135 is the same as or is coupled to the control system that performs functions such as collision avoidance or automated braking in the automobile 110. According to an exemplary embodiment, the memory device 137 stores mapping information that overlays the position of the platform 100, provided by the GPS receiver 132 or another source, on a map. That is, known mapping algorithms store the position of stationary objects 140 and road configurations between waypoints. In FIG. 1, stationary objects 140a (building and sign) are in the line of sight of the radar system 120 of the platform 100, while stationary object 140b (building) is outside the line of sight of the radar system 120. These designations are used for the discussion below. This information is used to provide directions to a specified building and indicate that the building has been reached, for example. That same positioning information that is used to provide directions is used according to one or more embodiments to obtain ground truth on stationary objects 140 (e.g., building) for purposes of radar calibration. According to alternate or additional embodiments, the mapping information is obtained via the controller 135 based on wireless communication (e.g., from cloud storage).

A radar calibration process is initiated periodically or based on an event (e.g., user trigger, controller 135 trigger). Calibration—i.e., making modifications of radar parameters based on the difference between radar detections and ground truth—can be performed by averaging the result of observations over time rather than based on a single comparison of measured to actual values at a single position of the platform 100. The position of the platform 100 is obtained, the position of stationary objects 140a in the line of the sight of the platform 100 is obtained from the mapping software, and the radar system 120 detects those stationary objects 140a. Specifically, the angular estimation of the position of one or more objects 140a by the radar system 120 is calibrated rather than range and Doppler estimation.

To be clear, the radar system 120 detects all targets in its line of sight (e.g., buildings, lamp posts, signs, another vehicle 110, pedestrians). Further, the mapping software can provide ground truth on stationary objects 140 (e.g., buildings) that are both within and out of the line of sight of the radar system 120. Thus, one or more relevant stationary objects 140a (referred to here, for explanatory purposes, as static anchors 145 used in calibration) must first be identified that are both detected by the radar system 120 and whose position is known according to the mapping algorithm. In the exemplary scenario shown in FIG. 1, the building is a relevant stationary object 140a (static anchor 145) but the sign is only a stationary object 140a rather than also being a static anchor 145, because the sign is not mapped and, thus, ground truth is not available. Exemplary techniques by which static anchors 145 can be determined are discussed below.

In some environments, the different objects 140a detected by the radar system 120 may be easily discerned such that the static anchors 145 for which ground truth is available may be determined in a straight-forward manner. For example, once moving objects are eliminated from the targets detected by the radar system 120 (via Doppler information detected by the radar system 120), a set of possible relevant stationary objects 140a remains. In the exemplary scenario of FIG. 1, a comparison of radar parameters obtained for these stationary objects 140a (sign and building) with positions indicated by the mapping algorithm (building only) will indicate which stationary objects 140a are static anchors 145 for which ground truth is known (i.e., the building in the example).

In a target-dense environment in which the various objects detected by the radar system 120 are not easily discerned, however, other sensors 130 of the platform 100 may be helpful to isolate the radar parameters associated with the stationary objects 140a for which ground truth is available. According to one exemplary embodiment, the camera 131 or lidar array may help differentiate the static anchors 145 of interest from other stationary objects 140a. According to another exemplary embodiment, the range detected by the radar system 120 is matched with the range to different stationary objects 140a that are mapped. For example, the ranges obtained by the radar system 120 to both the sign and the building shown in FIG. 1 are compared with ranges to stationary objects 140a in the map. Only the range to the building would match, because the sign is not in the map. Accordingly, the building could be identified as a static anchor 145. Even if this matching process produces an error, the averaging of observations over time would effectively filter out false outliers.

The relative position of the static anchors 145 to the radar system 120 may be determined from the mapping information. According to an exemplary embodiment, the platform 100 is stationary (e.g., stopped at a light) during calibration. According to an alternate embodiment, the platform 100 is moving. In this case, the positions of the platform 100 and stationary objects 140 and radar reflections 122 are all received at the same time (or as close to the same time as possible).

The calibration of the radar system 120 involves determining a correction factor between the radar system 120 and the ground truth. As previously noted, this determination of a correction factor may be based on averaging the observations at several locations over time. This correction factor may be used in the radar system 120 to correct detections such that the detected position of the stationary objects 140 matches the actual (ground truth) position provided by the GPS-based position of the platform 100 and the mapping. According to an exemplary embodiment, a known calibration mismatch model is used to perform the calibration. According to the model:

$$y \approx Hq(\theta) + n \qquad [\text{EQ. 1}]$$

In EQ. 1, y is the observation vector or the non-calibrated reflections 122, n is noise, H is a diagonal matrix of the mismatch between the radar reflections 122 and the ideal reflections ($q(\theta)$) that are synthetically generated based on the ground truth information. That is, the ideal or actual received signal $q(\theta)$ is generated based on known parameters (e.g., range, Doppler, angle of arrival) associated with the stationary objects 140 according to the GPS receiver 132 and the map.

A mismatch correction vector b is given by:

$$\hat{b} = \arg\min_b \|\text{diag}\{b\}y - q(\theta)\|^2 \qquad [\text{EQ. 2}]$$

The diagonal matrix b that minimizes the correction vector $\hat{b}$ is found. Once the diagonal matrix b is determined based on EQ. 2, reflections 122 received by the radar system 120 are corrected. The calibrated or corrected received signals $\tilde{y}$ are obtained using the correction vector $\hat{b}$ and the observation vector y (received reflections 122) according to the following:

$$\tilde{y} = \text{diag}\{\hat{b}\}y \qquad [\text{EQ. 3}]$$

According to another, more general embodiment, the equations discussed previously may be generalized such that the calibration matrix is not diagonal. N total combinations of transmit and receive antenna elements are assumed. For example, with one transmit element and four receive elements, N would be 4, but with two transmit elements and four receive elements in a MIMO configuration, N would be 8, because each of the four receive elements receives the reflections resulting from each of the two transmit elements. In this case, the calibration matrix, denoted as $\hat{B}$, is an N-by-N matrix and is not necessarily diagonal. If there are M static anchors 145, then M different angular estimations $[\theta_1, \theta_2, \ldots, \theta_M]$ result. As previously noted, the M static anchors 145 need not be present in one location but may, instead, be part of observations at different locations over time.

The received array response $y_m$ for a given static object 145 at angle $\theta_m$ has a dimension of N-by-1 such that the observation matrix is given by:

$$Y=[y_1 y_2 \ldots y_M] \quad [EQ.~4]$$

The synthetic desired array response $q(\theta_m)$ at angle $\theta_m$ has a dimension of N-by-1 such that the synthetic response matrix is given by:

$$Q=[q(\theta_1) q(\theta_2) \ldots q(\theta_M)] \quad [EQ.~5]$$

Then the calibration matrix $\hat{B}$ can be obtained from:

$$\hat{B}=\arg\min_B \|BY-Q\|^p \quad [EQ.~6]$$

In EQ. 6, p is greater than zero (e.g., p=1 or p=2). The calibration matrix $\hat{B}$ is an N-by-M matrix. Once the correction matrix B is determined from the minimization, the corrected received signal matrix can be obtained as:

$$\tilde{Y}=B \cdot Y \quad [EQ.~7]$$

Figure 2:
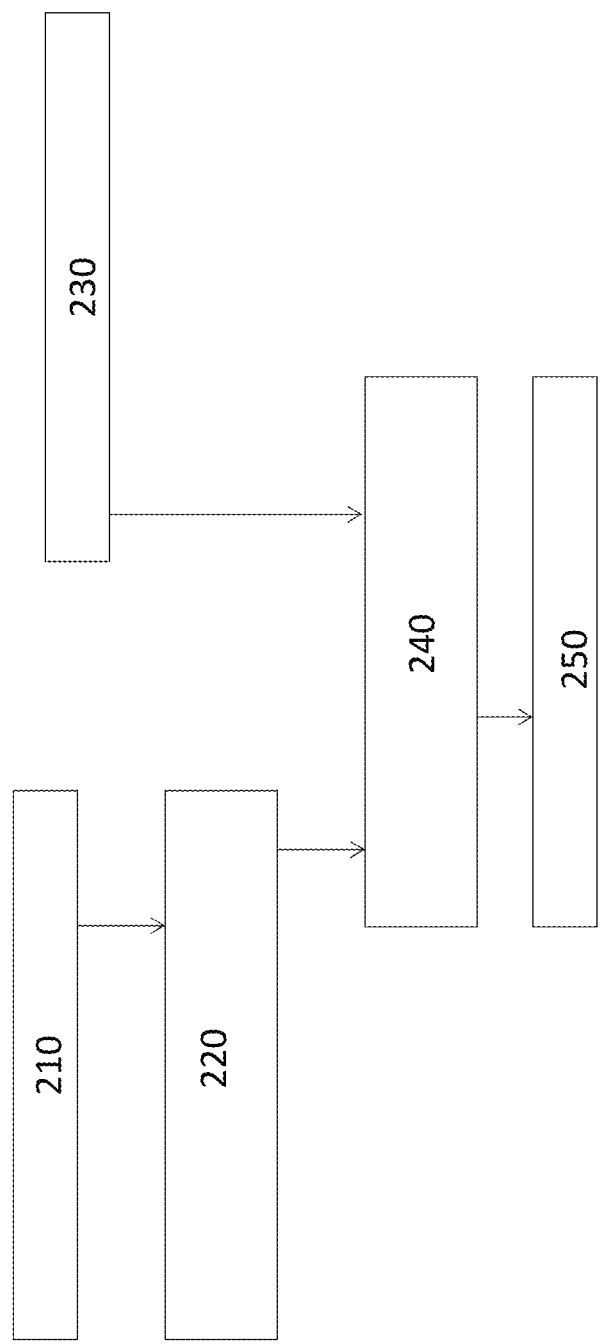
FIG. 2 is a process flow of a method of performing radar calibration according to one or more embodiments.

FIG. 2 is a process flow of a method of performing radar calibration according to one or more embodiments. At block 210, obtaining a position of the platform 100 includes using the automobile 110 GPS receiver 132, another satellite-based positioning system, cellular-based positioning, or fingerprinting-based positioning, for example. Obtaining the relative position of one or more static anchors 145 to the platform 100 (i.e., obtaining ground truth), at block 220, includes using a mapping algorithm to obtain the position of the static anchors 145 and determining line-of-sight relative position of the static anchor 145. As previously noted, the radar system 120 will detect objects (e.g., street light, pedestrian, vehicles) that are additional to the one or more static anchors 145 for which ground truth is known based on the mapping algorithm. Thus, part of the processing at block 220 is distinguishing the static anchors 145 from other stationary objects 140a, as discussed previously. At block 230, the processes include obtaining one or more radar parameters associated with one or more static anchors 145 using the radar system 120.

Once radar parameters (e.g., range, angle of arrival, Doppler) obtained by the radar system 120 and corresponding ground truth are obtained, the difference between detected and actual values of angular estimation (i.e., difference matrix H) facilitates the determination of an ideal or actual received signal $q(\theta)$ based on EQ. 1, for example, at block 240. This, in turn, facilitates the determination of a correction matrix B according to EQ. 6 or, according to the previously discussed specific embodiment, the correction vector $\hat{b}$ according to EQ. 2. Based on the correction matrix B, correcting received signals according to EQ. 7 or, in a specific embodiment, according to EQ. 3, at block 250, provides the calibrated radar output.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of performing calibration of a radar system on a mobile platform, the method comprising:
    obtaining a position of the platform;
    obtaining a relative position of one or more stationary objects from the platform using the position of the platform and a mapping algorithm as ground truth;
    obtaining one or more radar parameters regarding the one or more stationary objects using the radar system, the one or more radar parameters including an angle estimate;
    determining a correction matrix B to match the one or more parameters and the ground truth;
    receiving subsequent received signals of the radar system; and
    correcting the subsequent received signals using the correction matrix B to obtain corrected received signals, wherein the determining the correction matrix B includes solving for the correction matrix B that minimizes the calibration matrix $\hat{B}$:

$$\hat{B}=\arg\min_B \|BY-Q\|^p, \text{ wherein}$$

Y is an observation matrix of the angle estimates for each of the one or more stationary objects obtained using the radar system, and Q is a matrix of desired responses determined using the ground truth, and p is greater than 0.

2. The method according to claim 1, wherein the obtaining the one or more radar parameters additionally includes obtaining range or Doppler.

3. The method according to claim 1, further comprising generating the matrix of desired responses Q as a matrix of array responses, wherein a given array response $q(\theta_m)$ for a given angle estimate $\theta_m$ is obtained from a corresponding observation array $y_m$ that is part of the observation matrix Y based on:

$$y_m \approx H q(\theta_m)+n, \text{ wherein}$$

H is a matrix of a mismatch between the ground truth and the given angle estimate $\theta_m$ obtained using the radar system, and n is noise.

4. The method according to claim 1, wherein the corrected received signals $\tilde{Y}$ are given by:

$$\tilde{Y}=B \cdot Y$$

5. A calibration system for a radar system on a mobile platform, the system comprising:
    a satellite or cellular-based receiver configured to obtain a position of the platform;
    a processor configured to execute a mapping algorithm to obtain a relative position of one or more stationary objects from the platform as ground truth based on the position of the platform;

the radar system configured to obtain one or more radar parameters regarding the one or more stationary objects, the one or more radar parameters including an angle estimate; and a processor configured to determine a correction matrix to match the one or more parameters and the ground truth, to obtain subsequent received signals of the radar system, and to correct the subsequent received signals using the correction matrix B to obtain corrected received signals $\tilde{Y}$, wherein the processor determines the correction matrix B by solving for the correction matrix B that minimizes the correction matrix $\hat{B}$:

$$\hat{B} = \arg\min_B \|BY - Q\|^p, \text{ wherein}$$

Y is an observation matrix of the angle estimates for each of the one or more stationary objects obtained using the radar system, and Q is a matrix of desired responses determined using the ground truth, and p is greater than 0.

6. The system according to claim 5, wherein the one or more radar parameters additionally includes range or Doppler.

7. The system according to claim 5, wherein the processor generates the matrix of desired responses Q as a matrix of array responses, wherein a given array response $q(\theta_m)$ for a given angle estimate $\theta_m$ is obtained from a corresponding observation array $y_m$ that is part of the observation matrix Y based on:

$$y_m \approx Hq(\theta_m) + n, \text{ wherein}$$

H is a matrix of a mismatch between the ground truth and the given angle estimate $\theta_m$ obtained using the radar system, and n is noise.

8. The system according to claim 5, wherein the processor obtains the corrected received signals $\tilde{Y}$ based on:

$$\tilde{Y} = B \cdot Y$$

* * * * *